United States Patent [19]

Nakagawa et al.

[11] Patent Number: 4,868,029
[45] Date of Patent: Sep. 19, 1989

[54] TOOTHED RUBBER BELTS

[75] Inventors: Tatsushi Nakagawa; Yoshiaki Ishida; Kanesaka Junichiro; Yosuke Kaneshige, all of Yamaguchi, Japan

[73] Assignee: Tosoh Corporation, Yamaguchi, Japan

[21] Appl. No.: 170,207

[22] Filed: Mar. 18, 1988

[51] Int. Cl.$^4$ ............................................. B65G 15/36
[52] U.S. Cl. .................................... 428/163; 428/167; 428/421; 428/165; 525/332.8
[58] Field of Search ................ 525/332, 385; 428/421, 428/163, 165, 167

[56] References Cited

U.S. PATENT DOCUMENTS 3,565,974  2/1971  Ohnuma et al. ................. 525/385 X
4,041,207  8/1977  Takada et al. ......................... 428/421
4,510,303  4/1985  Oda et al. ..................... 525/332.8 X

FOREIGN PATENT DOCUMENTS 239744  3/1984  Czechoslovakia .
195162  2/1985  Japan .
256851  11/1987 Japan .

Primary Examiner—Nancy A. B. Swisher
Attorney, Agent, or Firm—Sughrue, Mion, Zinn, Macpeak & Seas

[57] ABSTRACT

A toothed rubber belt is disclosed, comprising a chlorosulfonated ethylene-α-olefin copolymer as the rubber material, which has excellent heat resistance and cold resistance.

2 Claims, 1 Drawing Sheet

TOOTHED RUBBER BELTS

FIELD OF THE INVENTION

This invention relates to a toothed rubber belt, and more particularly to a toothed rubber belt having excellent heat resistance and cold resistance.

BACKGROUND OF THE INVENTION

A toothed rubber belt is a transmission belt sometimes called as timing belt.

Different from general V-belts, the toothed belt itself has a tooth form and transmits a power by directly interlocking with toothed wheels.

Accordingly, since the toothed rubber belt is required to have mechanical characteristics capable of enduring stress directly applied to the tooth, the product is required to endure more severe conditions than general rubber belts.

A toothed rubber belt has been used for a power transmission system such as automobiles, motorcycles, bicycles, etc., as a substitution for conventional metal chains.

Hitherto, as a toothed rubber belt for automobiles, a toothed rubber belt using chloroprene rubber as the rubber material has been widely utilized.

However, with the recent increase of the temperature of the engine room of an automobile and the increase of the using life thereof accompanied by maintenance-free properties, a toothed rubber belt using a rubber material more excellent in heat resistance and durability than those of chloroprene rubber has been desired.

On the other hand, chlorosulfonated polyethylene is a rubber material which is better than chloroprene rubber in heat resistance, weather resistance, and ozone resistance and, hence, is a preferred material for improving the heat resistance and durability of a toothed rubber belt.

However, since chlorosulfonated polyethylene is greatly inferior in cold resistance to chloroprene rubber, it is sometimes difficult to clear the cold resistance required for toothed rubber belts.

Accordingly, a rubber material for toothed rubber belts capable of enduring the severe conditions required for meeting both heat resistance and cold resistance as in the case of automobiles has been demanded.

SUMMARY OF THE INVENTION

As the results of various investigations for developing the aforesaid rubber material, the inventors have discovered that the aforesaid demand can be attained by a chlorosulfonated ethylene·α-olefin copolymer.

That is, according to this invention, there is provided a toothed rubber belt comprising a chlorosulfonated ethylene·α-olefin copolymer as the rubber material.

DETAILED DESCRIPTION OF THE INVENTION

Figure 1:
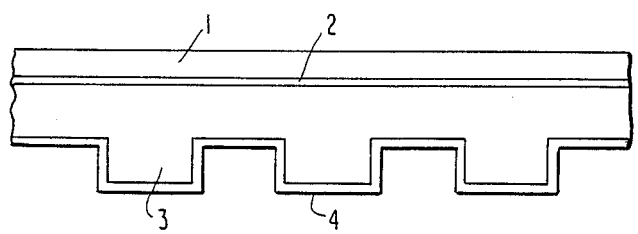
FIG. 1 is a schematic sectional view showing an example of the toothed rubber belt of this invention.

Then, the invention is explained below in detail.

A toothed rubber belt is generally composed of a back cover, a cord, a rubber tooth, and a fabric, which are superposed to each other.

Such a toothed rubber belt is illustrated in FIG. 1 of the accompanying drawing.

That is, a toothed rubber belt is composed of a back cover 1, a cord 2, a rubber tooth 3, and a fabric 4.

In the toothed rubber belt proposed by the inventors, the rubber material for the back cover and/or the rubber tooth thereof is composed of a chlorosulfonated ethylene·α-olefin copolymer.

As the cord for the toothed rubber belt, glass fibers or aramid fibers are used and as the fabric, a nylon cloth is typically used.

The required values necessary for the rubber materials for toothed rubber belt equipped with the desired heat resistance and cold resistance in this invention are as follows.

1. About fluidity and workability:
Mooney Viscosity ($ML_{1+4}$, 100° C.): 30 to 80.
2. About tensile properties:
Hardness: 60 to 90
Tensile Strength: 200 kg/cm² or more
Elongation: 250% or more
100% Modulus: 30 to 70 kg/cm²
3. About heat resistance:
$\Delta Hs$ (difference): +3 or less
$\Delta T_B$, $\Delta E_B$, $\Delta M_{100}$ (variation ratio): 20% or less
4. About cold resistance by Gehman torsion test:
$T_2$: −15° C. or less
$T_5$: −20° C. or less
$T_{10}$: −25° C. or less The materials meeting the aforesaid conditions guarantee improvements of durability in heat resistance and cold resistance.

A chlorosulfonated ethylene·α-olefin copolymer for use in this invention is generally a copolymer obtained by chlorinating and chlorosulfonating an ethylene·α-olefin copolymer as the raw material.

As the ethylene·α-olefin copolymer, there are, for example, an ethylene·butene-1 copolymer, an ethylene·propylene copolymer, an ethylene·hexene-1 copolymer, an ethylene·octene-1 copolymer, and an ethylene·4-methylpentene-1 copolymer.

In the copolymer, the ratio of ethylene/α-olefin is desirably from 98/2 to 60/40.

If the ratio is outside the aforesaid range, the desired cold resistance becomes unobtainable.

A particularly preferred ethylene·α-olefin copolymer in this invention is a copolymer of ethylene and butene-1 having an ethylene/butene-1 ratio in the range of from 95/5 to 70/30.

If the composition of ethylene and α-olefin as the raw materials for the copolymer is once selected, the composition of ethylene and α-olefin is kept as it is in the chlorosulfonated ethylene·α-olefin copolymer obtained by chlorinating and chlorosulfonating the copolymer.

On the other hand, the mole ratio of ethylene and butene-1 may be expressed by the number of ethyl groups per 1,000 carbon atoms. That is, the component ratio of a composition having an ethylene/butene-1 ratio of from 98/2 to 60/40 may be expressed as from 10 to 200 ethyl groups per 1,000 carbon atoms.

The content of chlorine contained in the chlorosulfonated ethylene·α-olefin copolymer is preferably from 25 to 32% by weight.

If the chlorine content is less than 25% by weight or over 32% by weight, the desired cold resistance is unobtainable. A particularly preferred chlorine content is from 28 to 31% by weight.

The content of sulfur contained in the chlorosulfonated ethylene-α-olefin copolymer for use in this invention is a measure of showing the content of the group shown by —SO$_2$Cl acting as crosslinking sites and is preferably from 0.3 to 2.5% by weight, more preferably from 0.5 to 1.5% by weight.

For synthesizing the chlorosulfonated ethylene-α-olefin copolymer, a method of reacting an ethylene-α-olefin copolymer as the raw material with chlorine and sulfur dioxide, chlorine and sulfuryl chloride or sulfuryl chloride alone using a radical generating agent as a catalyst is generally employed.

For performing the aforesaid reaction, there are a homogeneous system of performing the reaction in a solution of the reactants, a heterogeneous system of performing the reaction in a suspension, and a heterogeneous system of performing the reaction in a gaseous phase. The homogeneous system of performing the reaction in a solution of an ethylene-α-olefin copolymer as a raw material dissolved in a solvent gives the chlorosulfonated ethylene-α-olefin copolymer excellent in both the heat resistance and cold resistance and, hence, is preferably used in this invention.

In this case, a solvent inert to the halogenation reaction, such as carbon tetrachloride, chloroform, monochlorobenzene, tetrachloroethane, etc., is used as the solvent.

The chlorosulfonated ethylene-α-olefin copolymer for use in this invention is vulcanized together with such ingredients as, for example, a reinforcing agent, a filler, a vulcanizing agent, a vulcanization accelerator, a processing aid, a softening agent, a plasticizer, an antioxidant, etc.

As the reinforcing agent and filler, there are, for example, carbon black, white carbon, calcium carbonate, clay, talc, and titanium oxide.

As the vulcanizing agent and vulcanization accelerator, there are, for example, magnesia, calcium oxide, calcium hydroxide, dipentamethylehethiuram tetrasulfide (TRA), tetramethylthiuram disulfide (TT), ethylenethiourea (#22), a maleimide, and a peroxide.

As the processing aid, there are, for example, low molecular weight polyethylene and metal soaps.

As the softening agent and plasticizer, there are, for example, various oils, esters, and chlorinated paraffins.

As the antioxidant, there are, for example, nickel dibutyldithiocarbamate (NBC), amine compounds, and phenolic compounds.

The toothed rubber belt of this invention is the material with heat resistance and cold resistance.

Accordingly, the toothed rubber belt of this invention is suitable for the field of requiring heat resistance and cold resistance, such as the fields of automobiles and motorcycles.

The following examples are intended to illustrate the present invention more specifically but not to limit it in any way.

In addition, the values used in these examples were obtained according to the following measuring methods.

Mole ratio of ethylene/butene-1:

| | |
|---|---|
| Mole ratio of ethylene/butene-1: | Analyzed by $^{13}$C—NMR |
| Melt index: | JIS K 7210 |
| Density: | JIS K 7112 |
| Contents of chlorine and sulfur: | Combusion flask method |
| Mooney viscosity: | JIS K 6300 |
| Vulcanized rubber properties: | JIS K 6301 |

In addition, the chlorosulfonated ethylene-butene-1 copolymers used in these examples were prepared as follows.

[Chlorosulfonated copolymer used in Example 1]

After dissolving 3360 g of an ethylene-butene-1 copolymer (melt index: 4 g/10 min., density: 0.89 g/cc) composed of 91.7 mole % ethylene and 8.3 mole % butene-1 in carbon tetrachloride, the copolymer was reacted with 5620 g of sulfuryl chloride with the addition of 12 g of α,α-azobisisobutyronitrile as a radical generating agent and 0.25 g of pyridine as a promoter.

After the reaction was over, acid components remaining in the solution were removed, and then 17 g of 2,2'-bis(4-glycidyloxyphenyl)propane was added thereto. Then, the solution was fed to a drum dryer by an ordinary manner to separate the product from the solvent.

The result of the analysis of the chlorosulfonated ethylene-butene-1 copolymer thus obtained showed that the copolymer contained 30.1% by weight of chlorine and 1.02% by weight sulfur. The Mooney viscosity (ML$_{1+4}$, 100° C.) was 58.

[Chlorosulfonated copolymer used in Example 2]

By following the same procedure as Example 1 except that the following ethylene-butene-1 copolymer was used as the raw material, a chlorosulfonated copolymer was obtained.

Ethylene-butene-1 copolymer:
Ratio of ethylene/butene-1: 92.3/7.7
Melt index: 3 g/10 min.
Density: 0.89 g/cc.

The result of the analysis of the chlorosulfonated ethylene-butene-1 copolymer thus obtained showed that the copolymer contained 30.0% by weight of chlorine and 0.99% by weight sulfur. The Mooney viscosity (ML$_{1+4}$, 100° C.) thereof was 65.

[Chlorosulfonated copolymer used in Example 3]

By following the same procedure as Example 1 except that the following ethylene-butene-1 copolymer was used.

Ethylene-butene-1 copolymer:
Ratio of ethylene/butene-1: 92.3/7.7
Melt index: 8 g/10 min.
Density: 0.89 g/cc.

The result of the analysis of the chlorosulfonated ethylene-butene-1 copolymer thus obtained showed that the copolymer contained 30.0% by weight of chlorine and 1.01% by weight sulfur. The Mooney viscosity (ML$_{1+4}$, 100° C.) was 44.

EXAMPLE 1

The chlorosulfonated ethylene-butene-1 copolymer described hereinbefore was kneaded by means of a 10-inch open roll mill in a compounding system shown in Table 1 below.

Thereafter, the kneaded product was subjected to press vulcanization for 40 minutes at 150° C., and the tests for the tensile characteristics and heat aging resistance and the Gehman torsion test for cold resistance were applied to the sample. The results obtained are shown in Table 2 below.

TABLE 1

| | Examples 1 to 3 | Comparison Examples 1 and 2 | Comparison Example 3 |
|---|---|---|---|
| Chlorosulfonated ethylene.butene-1 copolymer | 100 | | |
| Chlorosulfonated polyethylene | | 100 | |
| Chloroprene rubber | | | 100 |
| MgO #150 | 5 | 5 | 4 |
| Antioxidant octamine | — | — | 2 |
| Stearic acid | — | — | 0.5 |
| Antioxidant NBC | 3 | 3 | — |
| ACpolyethylene ® 617-A | 3 | 3 | — |
| Suntight ® | 2 | 2 | 1 |
| Sprender ® R300 | 2 | 2 | — |
| SFR carbon black | 35 | 35 | 50 |
| Dexy clay | 15 | 15 | — |
| Dioctylsebacic acid | 8 | 8 | 10 |
| ZnO #1 | — | — | 5 |
| Pentaerythritol | 3 | 3 | — |
| Accelerator TRA | 2 | 2 | — |
| Accelerator PM | 3 | 3 | — |
| Accelerator 22C | — | — | 1 |
| Accelerator TT | — | — | 0.5 |
| Sum | 181 | 181 | 174 |

TABLE 2

| | Example 1 | Example 2 | Example 3 | Comparison Example 1 | Comparison Example 2 | Comparison Example 3 |
|---|---|---|---|---|---|---|
| Tensile Properties* | | | | | | |
| Hardness (JIS A) | 70 | 70 | 69 | 70 | 70 | 68 |
| Tensile strength (kg/cm$^2$) | 208 | 213 | 220 | 218 | 211 | 178 |
| Elongation (%) | 270 | 260 | 290 | 300 | 290 | 280 |
| 100% Modulus (kg/cm$^2$) | 60 | 59 | 55 | 58 | 60 | 40 |
| Heat Resistance** | | | | | | |
| $\Delta H_S$ | +2 | +1 | +2 | +2 | +2 | +7 |
| $\Delta T_B$ (%) | −7 | −5 | −6 | 0 | −1 | −3 |
| $\Delta E_B$ (%) | −11 | −12 | −11 | −5 | −7 | −12 |
| $\Delta M_{100}$ (%) | +15 | +15 | +12 | +8 | +12 | +40 |
| Gehman Torsion Test | | | | | | |
| $T_2$ (°C.) | −17 | −17 | −16 | −11 | −10 | −30 |
| $T_5$ (°C.) | −26 | −26 | −25 | −19 | −18 | −36 |
| $T_{10}$ (°C.) | −28 | −27 | −27 | −22 | −22 | −38 |
| $T_{100}$ (°C.) | −36 | −35 | −35 | −30 | −30 | −44 |

*[1]Examples 1 to 3 and Comparison Examples 1 and 2: Vulcanization for 40 min. at 150° C. Comparison Example 3: Vulcanization for 30 min. at 150° C.
**Change after 70 hours at 120° C.

EXAMPLE 2

Same kneading, vulcanization, and tests as in Example 1 were followed using the chlorosulfonated ethylene·butene-1 copolymer prepared for Example 2 described above. The results obtained are shown in Table 2 above.

EXAMPLE 3

Same kneading, vulcanization, and tests as in Example 1 were followed using the chlorosulfonated ethylene·butene-1 copolymer prepared for Example 3 described above. The results obtained are shown in Table 2 above.

COMPARISON EXAMPLE 1

Same kneading, vulcanization, and tests as in Example 1 were followed using TOSO-CSM ® TS-530 (a trade name, made by Tosoh Corporation) as chlorosulfonated polyethylene. The results obtained are shown in Table 2 above.

COMPARISON EXAMPLE 2

Same kneading, vulcanization, and tests as in Example 1 were followed using Hypalon ® #40 (a trade name, made by E. I. Du Pont) as chlorosulfonated ethylene. The results obtained are shown in Table 2 above.

COMPARISON EXAMPLE 3

Same kneading, vulcanization, and tests as in Example 1 were followed using chloroprene rubber (TN-504, a product made by Tosoh Corporation) as the rubber material with compounding ingredients shown in Table 1 above. In this case, however, the vulcanization was a press vulcanization for 30 minutes at 150° C. The results obtained are shown in Table 2.

From the results shown in Table 2, it can be clearly seen that the chlorosulfonated ethylene·α-olefin copolymer which is employed as rubber material in this invention is a suitable rubber material for toothed rubber belts excellent in both the heat resistance and cold resistance thereof.

While the invention has been described in detail and with reference to specific embodiments thereof, it will be apparent to one skilled in the art that various changes and modifications can be made therein without departing from the spirit and scope thereof.

What is claimed is:

1. A toothed rubber belt comprising a chlorosulfonated ethylene/butene-1 copolymer as the rubber material, which is obtained by chlorinating and chlorosulfonating a copolymer of ethylene and butene-1 having an ethylene/butene-1 molar ratio of from 95/5 to 70/30 and having no third component, said chlorosulfonated ethylene/butene-1 copolymer having a chlorine content of from 25 to 32% by weight and a sulfur content of from 0.3 to 2.5% by weight based on the weight of said chlorosulfonated ethylene/butene-1 copolymer.

2. The toothed rubber belt as claimed in claim 1, wherein the chlorosulfonated ethylene·α-olefin copolymer is vulcanized with ingredients for vulcanization.

* * * * *